INVENTORS
GEORGE C. SZIKLAI AND
PHILIP T. SMITH
BY
ATTORNEY

INVENTORS
GEORGE C. SZIKLAI AND
PHILIP T. SMITH
BY
ATTORNEY

INVENTORS
GEORGE C. SZIKLAI AND
PHILIP T. SMITH
BY
ATTORNEY

INVENTORS
GEORGE C. SZIKLAI AND
PHILIP T. SMITH
BY
[signature]
ATTORNEY

Aug. 17, 1954 G. C. SZIKLAI ET AL 2,686,899

SIGNAL TRANSMISSION

Filed March 1, 1950 5 Sheets-Sheet 5

INVENTOR.
George C. Sziklai AND
Philip T. Smith
BY [signature]
ATTORNEY

Patented Aug. 17, 1954

2,686,899

UNITED STATES PATENT OFFICE 2,686,899

SIGNAL TRANSMISSION

George C. Sziklai and Philip T. Smith, Princeton, N. J., assignors to Radio Corporation of America, a corporation of Delaware Application March 1, 1950, Serial No. 146,946

13 Claims. (Cl. 332—9)

This invention relates to methods of and apparatus for transmitting intelligence with greater efficiency and at increased maximum power.

The most apparent way of increasing the power output of a transmitter is to operate a plurality of output stages in parallel so as to add their powers. However, this method becomes increasingly inefficient as higher and higher power levels are attained because each output stage loads down the others. Furthermore, when such a method of increasing power is applied to transmitters operating at high carrier frequencies, the distributed capacitance to ground, both at the input and output terminals is added directly. This further reduces the available maximum power and efficiency.

In order to overcome these difficulties, various methods have been proposed for adding the currents or voltages rather than the powers supplied by a plurality of output stages. Each output stage is made independent of the others so that it does not act as a load. Furthermore, the input and output capacities to ground are entirely separated so that the high frequency performance is the same as for any single output stage.

However, in either of these types of transmitters, the output stages are conventionally confined in their operation to the linear portion of the plate current vs. input voltage characteristic. This is required in order to transmit the signal with reasonable fidelity. It is well known that a large increase in efficiency and power could be obtained in these systems if the same output stages were operated beyond the substantially linear portion of the characteristic as is done in Class C Telegraphy. However, operation in the nonlinear portion of the output stage characteristic by conventional means would produce an intolerable degree of distortion in the transmitted signal.

In accordance with a first aspect of this invention, as the signal to be transmitted changes from one predetermined discrete level to another, a different number of radio frequency power generating devices are made operative to supply a different amount of energy to a common output circuit. Each power generating device is therefore effectively on or off. More efficient supply of radio frequency energy to the output circuit is attained because each power generating device can be operated beyond the linear portion of its output vs. input characteristic. If the power generating devices are keyed amplifiers, they can then be operated in accordance with Class C Telegraphy practice. As pointed out above, this type of operation is the most efficient.

In any such arrangement where only discrete signal levels may be transmitted, the output wave form is of a stepped shape or quantized. That is to say, that the combined output signal of the power generating devices can only assume predetermined or discrete values and cannot assume intermediate values. As signals to be transmitted are generally of a continuous nature, this means that a certain amount of distortion is present. However, this can be minimized by the known expedient of increasing the number of levels transmitted.

In accordance with a second aspect of this invention, however, the signal transmitted conforms precisely to the desired signal independently of the number of discrete levels available. This is accomplished by effectively subtracting the stepped or quantized signal from the desired signal load adding the result to the levels established by the keyed radio frequency power generating devices.

The foregoing discussion relates to the operational efficiency of the output stages of a transmitter. The following discussion takes into account the efficiency of and the power required by the modulation process. Conventional practice requires either low level modulation and Class B Telephony operation of the output stages, or high level modulation and Class C Telephony operation of the output stages. In the first situation the power required for modulation is low, but the output stages operate inefficiently. In the second situation the reverse is true.

One of the advantages derived from the employment of the first aspect of this invention is that relatively low power is required for the modulation process, and at the same time the output stages may be operated at maximum efficiency.

Accordingly, one of the principal objects of this invention is to provide improved, more efficient methods of and apparatus for transmitting intelligence.

Another object of this invention is to provide a method of and apparatus for supplying radio frequency energy to a load at predetermined levels in accordance with the magnitude of the signal to be transmitted.

Still another object of the invention is to provide a method of and means for operating at least some of a plurality of combined output stages beyond the linear portion of their plate current vs. voltage input characteristic in such a manner as not to deteriorate the signal being transmitted.

These and other objects will become apparent from a detailed consideration of the drawings in which.

Figures 1, 2:
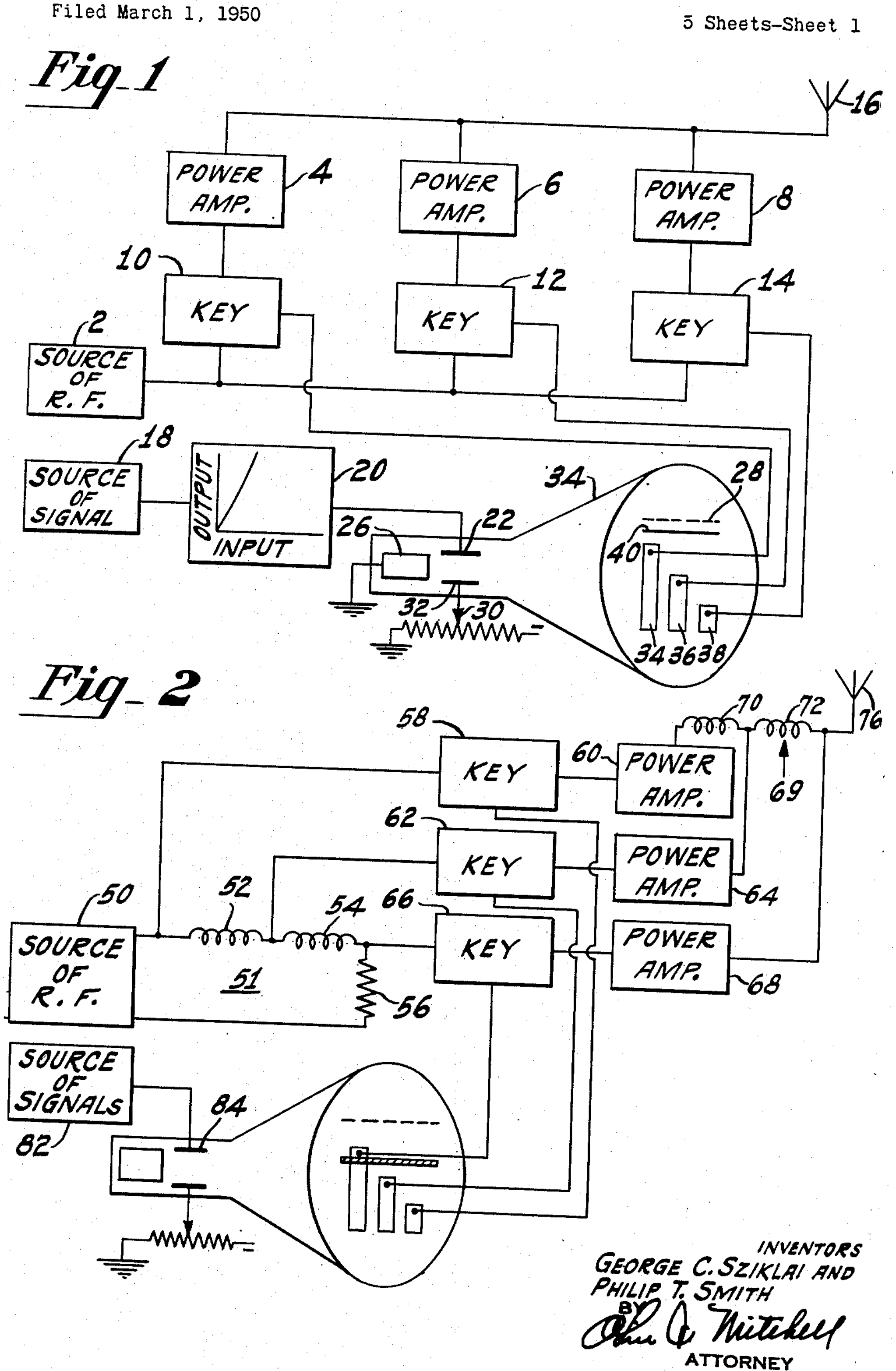
Figure 1 shows how one aspect of this invention may be applied to a transmitter in which the power of the output stages is added by connecting them in parallel.
Figure 2 illustrates how one aspect of this invention may be incorporated into a transmitter in which the current or voltage of the output stages is combined.

The adaptation of the first aspect of the invention to the type of transmitter in which the powers of the output stages are added is illustrated in Figure 1. Voltage waves of carrier frequency are supplied by source 2 to each of the parallel power amplifiers or high frequency power generating devices 4, 6 and 8 via their associated keys 10, 12 and 14. When key 10 is operative to pass the carrier energy from the source 2 to the power amplifier 4, a predetermined amount of power is supplied to an antenna 16. Inasmuch as the outputs of the power amplifiers are in phase, twice as much power is supplied to the antenna 16 if key 12 also is operative to pass the carrier energy from source 2 to power amplifier 6.

The keys 10, 12 and 14 are controlled in accordance with the power level of the signals supplied by source 18 in the following manner. The output of source 18 is applied to a device 20 having amplification characteristic of a type such that the output voltage is equal to the source of the input voltage. Amplifiers having substantially this type of characteristic are well known to those skilled in the art and need not be described in detail. In this way, the voltage wave supplied from the device 20 to the deflection plate 22 of cathode ray tube or level sorter 24 is proportional to the power of the signal supplied by the source 18.

A level sorter is herein defined as a device that provides a signal to a number of output circuits determined by the amplitude of the signals applied to it. A quantizer is a known device that provides discrete levels of signal to a single output circuit. The level is dependent on the magnitude of the signal applied to it. When biasing means are employed in several circuits connected to the single output of a quantizer, the arrangement may also be called a level sorter.

The cathode ray tube 24 is equipped with electron gun 26 of the type that is adapted to project a horizontal line beam of electrons. Such an electron gun is described in the U. S. Patent No. 2,434,713 issued on January 20, 1948 to Mueller. The no-signal position of this beam is adjusted to the dotted line 28 on the face of the tube by the potentiometer 30 that is connected to the other vertical deflection plate 32. Three equally wide vertical strips of current conducting material 34, 36 and 38 of different height are mounted on the inner face of the tube 24 so that when each is struck by the electron beam, it produces a given voltage. The bottom of the strip 38 is located at a point where the horizontal beam is deflected when the signals from the device 20 are at their maximum amplitude. In this particular arrangement the difference in the height of the strips is equal to the distance between the dotted line 28 and the top of strip 34. Strip 34 is connected to key 10, strip 36 to key 12, and strip 38 to key 14.

The overall operation of the device is as follows: When the horizontal electron beam indicated by the numeral 40 is in the region between the the dotted line 28 and the top of the strip 34, none of the power amplifiers 4, 6 and 8 are turned on and the power level of the output signal is zero. When the voltage of the signal supplied from the source 18 is sufficiently great to deflect the beam to strip 34, power amplifier 4 supplies radio frequency energy to the antenna 16. In a similar manner, power amplifiers 6 and 8 are successively turned on as the horizontal beam 40 is deflected downward to successively impinge upon the strips 36 and 38, respectively.

In most transmitters the power amplifiers include driving stages that increase the level of the signal before it is applied to the final tube. Therefore, it is seen that the modulation is done at a low level. Consequently, the power required for the modulation process is relatively small.

The need for transforming the signal supplied by the source 18 into a voltage wave representing the power levels in that signal, as is done in device 20, can best be illustrated by the following example. If the signals from source 18 were supplied directly to deflection plate 22, power amplifier 4 would be turned on when the signal from source 18 was at one-third its maximum amplitude and one-third of the total power available from the transmitter would be supplied to the antenna 16. However, when this signal is detected by a receiver the voltage level of the detected signal will be proportional to the square root of the transmitted power or $$\frac{1}{\sqrt{3}}$$

or approximately 58 percent of the maximum voltage which is available at source 18 instead of one-third of the maximum. When a device such as 20 is employed, however, amplifier 4 is turned on when the power of the signal supplied by signal source 18 is equal to one-third of its maximum value. As stated above, when a signal of this power is detected the output voltage is proportional to the square root of the power or $$\sqrt{\frac{1}{3}}$$

which is the desired signal.

Figure 2 illustrates the application of the above discussed aspect of this invention to a transmitter in which the currents or voltages, rather than the powers, of a plurality of power amplifiers or higher frequency power generating devices are added.

The following details do not form a part of the invention per se, but illustrate a way in which the currents of a plurality of power amplifiers may be added. However, the combination of means for adding currents of power amplifiers with other apparatus to be described does involve the principles of this invention. The principles of such current adding apparatus may be found in an article entitled "Distributed amplification" appearing in the August 1948 issue of the Proceedings of the I. R. E. on page 956. For purposes of convenience, however, the basic considerations for apparatus of this type may be described as follows.

The output of a source of radio frequency energy 50 is supplied to a first transmission line 51 comprised of inductances 52 and 54 and a resistance 56. The resistance is equal to the characteristic impedance of the line. Also included in this transmission 51 are the input shunt capacitances (not shown) of means for controlling the transfer of radio frequency energy to an output circuit. A key 58 controls the supply of radio frequency energy to a power amplifier 60 and is connected directly to the output of the source 50. A key 62 controls the supply of radio frequency energy to a power amplifier 64 and is connected to the junction of the inductances 52 and 54 so that the current in the input circuit of a power amplifier 64 passes through the inductance 52. A key 66 controls the supply of radio frequency energy to a power amplifier 68 and is connected to the junction of inductance 54 and resistance 56 so that current in its input circuit passes through both the inductances 52 and 54.

The output circuits of power amplifiers 60, 64 and 68, including their shunt capacitances to ground, not shown, form a part of a second transmission line 69. The transmission line 69 has a characteristic impedance equal to the characteristic impedance of an antenna 76 to which it is connected. The current supplied by the power amplifier 60 to the antenna 76 passes through series inductances 70 and 72. The current supplied by power amplifier 64 passes only through inductance 72, and the current supplied by power amplifier 68 passes directly to the antenna 76. The delay in the currents of the frequency supplied by the source 50 is the same for each section of the delay line 51 as for the delay line 69. A section includes only one of the inductances 52, 54, 70 and 72.

Accordingly, the radio frequency current from the source 50 passing through the key 58 and the power amplifier 60 is delayed by two sections of the transmission line associated with the inductances 70 and 72 before being applied to the antenna 76. The total delay experienced by the radio frequency energy passing from the source 50 through the key 62 and the power amplifier 64 is the same amount for it also passes through two sections of delay line, that associated with the inductance 52 of the delay line 51 and that associated with the inductance 72 of the delay line 79. The radio frequency current passing from the source 50 through the key 66 and the power amplifier 68 passes through the two sections of the delay line 51 associated with the inductances 52 and 54. Therefore, inasmuch as the radio frequency current from the source 50 passes through two sections of delay line having the same delay regardless of the power amplifier selected, the output currents or voltages of all the power amplifiers 60, 64 and 68 will be in phase in the antenna 76.

The following description relates to sorting apparatus for rendering the power amplifiers 60, 64 and 68 operative to pass radio frequency currents of predetermined discrete values to the antenna 76 in accordance with the invention. The keys 58, 62 and 66 which control the supply of radio frequency energy from the source 50 to the power amplifiers 60, 64 and 68 are controlled by a cathode ray tube 80 that is the same as cathode ray tube 24 of Figure 1. One difference in the control arrangement lies in the fact that the output signals of the source 82 are applied directly to one of the deflection plates 84, rather than being passed through a device such as 20 of Figure 1. The reason for this omission is that the power transmitted is proportional to the square of the sum of the currents appearing in the antenna that represent the intelligence to be transmitted.

In either Figure 1 or Figure 2, it will be apparent to those skilled in the art that the radio frequency energy from the source 50 does not have to pass through the various keys on its way to the power amplifiers, but that the power amplifiers may be biased on or off by the keying devices that are schematically represented.

Under most circumstances, it is preferable to key the power amplifiers on and off, but under some conditions, it may be desirable to permit the power amplifiers to operate continuously and to insert a key between them and an output load circuit. When the load is not applied to the power amplifiers they do not consume much power, but when the load is applied, they can deliver the same amount of power as in Class C Telegraphy operation.

All the foregoing description proceeds on the assumption that power amplifiers were to be used. In certain applications, however, they may not be advisable or necessary. For example, high frequency power generating devices such as oscillators may be used that are capable of supplying sufficient power directly. In this case they replace the power amplifiers. If separate oscillators are used, means known to those skilled in the art would be required to keep them in phase. Whatever the case, an important contribution of this invention is that radio frequency energy is supplied to an output circuit such as an antenna at predetermined levels by a plurality of means in accordance with the magnitude of the signal that corresponds to a desired intelligence.

Figure 3:
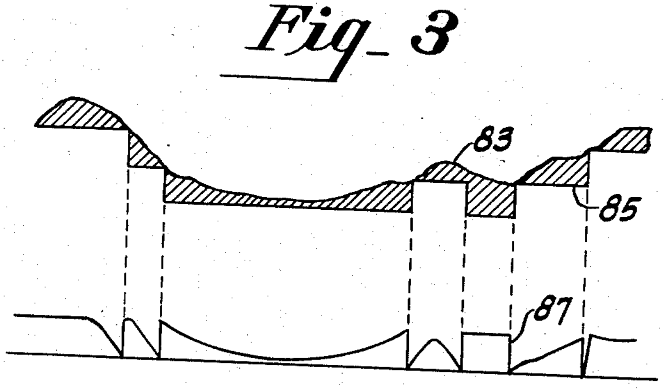
Figure 3 illustrates a quantized signal.

Apparatus constructed in accordance with the second aspect of this invention will now be discussed. It has been previously stated that the transmitters of Figures 1 and 2 substantially reproduce the signal to be transmitted if a sufficient number of power amplifiers are provided. In some applications, however, the number required becomes excessive and therefore the following improvements have been made which permit the transmitted signal to precisely conform to the information to be conveyed under any conditions. This is accomplished by modulating at least one power amplifier with a signal that represents the difference between the stepped or quantized output signal as it would have been transmitted by transmitters such as shown in Figures 1 and 2 and the signal that varies in accordance with the desired intelligence. In other words, the difference between the two signals is added to the transmitted signal. This difference signal will hereinafter be referred to as the residue signal. A graphical illustration of such a residue signal is shown in Figure 3 in which the signal to be transmitted is represented by curve 83. The stepped waveform 85 shows the type of current waveform that is supplied to the antenna 76 by keyed power amplifiers. The shaded area between the curves is the residue signal and is separately illustrated by curve 87.

Figure 3A:
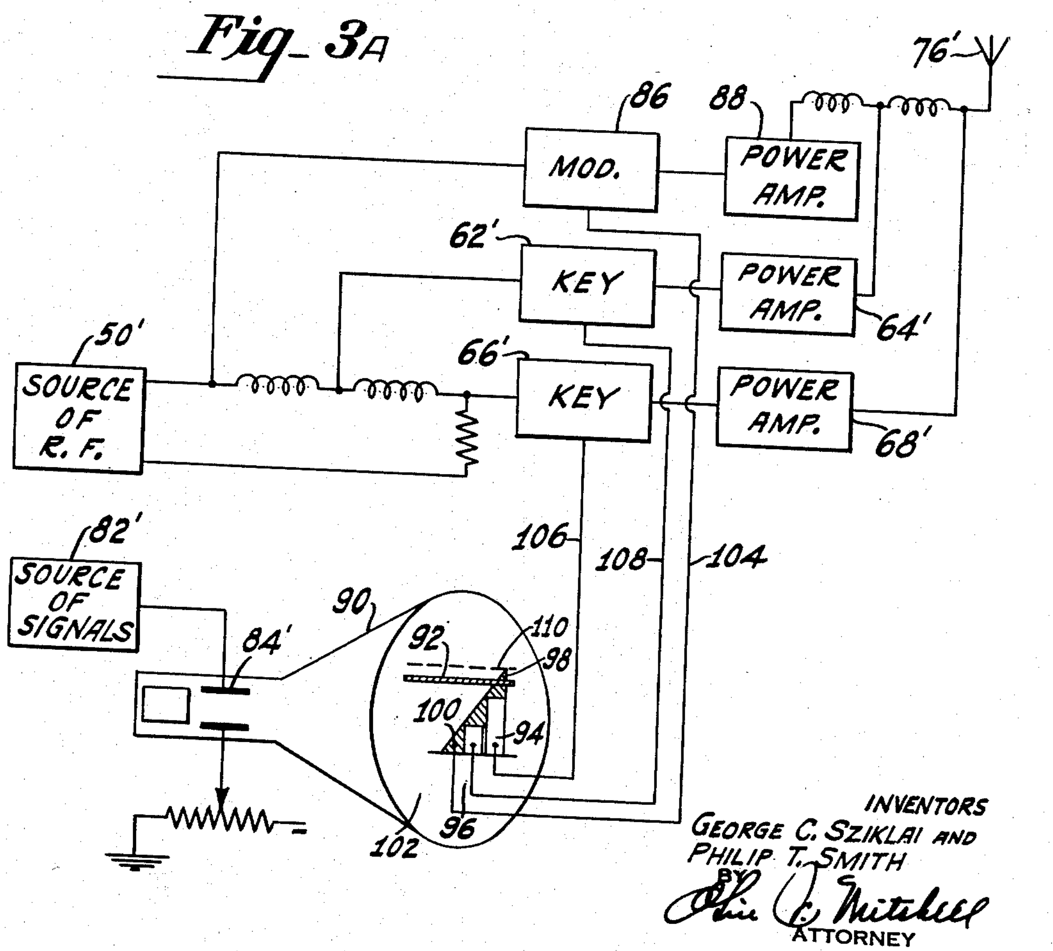
Figure 3A illustrates a transmitter wherein the currents or voltages are added so as to include the residue signal in accordance with the principles of this invention.

An apparatus for performing the functions described immedaitely above is illustrated in Figure 3A. For purposes of convenience, those components that correspond in function to the components of the transmitters shown in Figure 2 will be given similar numerals primed. It will be noted that the key 58 of Figure 2 has been replaced by a modulator 86. The current or voltage output of a power amplifier 88 which is associated with the modulator 86 is added to the outputs of the power amplifiers 64′ and 68′ in the same way as was discussed in connection with Figure 2.

It is important to note that the maximum output of the power amplifier 88 must be equal to the power contributed by either of the keyed power amplifiers 64′ or 68′ if the addition of the residue signal is to exactly fill in between steps of Figure 3. There are several ways in which this desired result can be obtained depending on the amount of distortion permissible, the predetermined level at which the keyed power amplifiers are operated and the number of keyed power amplifiers employed. Assuming that the keyed power amplifiers 64′ and 68′ are operated at plate saturation, it is evident that the modulator 86 would have to drive the modulated power amplifier 88 to plate saturation on a maximum residue signal in order for the antenna current derived from it to be equal to the current supplied by either of the power amplifiers 64′ and 68′ when they are keyed. This operation beyond the linear range of the modulated power amplifier 88 would produce distortion in the transmitted wave. Whether or not it is tolerable would depend on the circumstances. However, the percentage distortion of the residue signal supplied by the power amplifier 88 may be fairly large without noticeably deteriorating the total signal. For example, in the apparatus of Figure 3A, the maximum residue signal is one-third of the total signal. Accordingly, only a one-percent distortion is introduced in the transmitter output for every three-percent distortion in the residue signal. If nine keyed power amplifiers were employed and the maximum tolerable distortion in the transmitted signal is 3 percent, then the power amplifier 88 can have 30 percent distortion. If the distortion introduced by the power amplifier 86 is too great, a power amplifier of greater capacity may be employed. If, however, a sufficiently large power amplifier is used, the current supplied to the antenna 76′ from the modulated power amplifier 88 may be exactly the same as the residue signal, as the amplifier may be operated entirely on the linear portion of its characteristic.

Because the residue modulation has a maximum amplitude of only one discrete level, it does not consume much power. The keying can be done at low levels so as not to require much power, as previously noted.

The keys 66′ and 62′, as well as the modulator 86, are controlled by currents or voltages developed at the targets of a special cathode ray tube 90. The cathode ray tube 90 is similar to the cathode ray tube 80 which performed a sorting operation in the apparatus of Figure 2. Here again, the beam of electrons falls along a horizontal line having a cross section such as that indicated by the numeral 92. This beam is vertically deflected over the targets in accordance with signals from a source 82′ that are applied to a deflection plate 84′. The target structure is comprised of two vertical strips 94 and 96, the strip 94 being twice the height of strip 96. The strip 94 is connected to the key 66′ via a lead 106 and the strip 96 is connected to the key 62′ via a lead 108. The strips 94 and 96 operate to sort out the keyers to be operated just as the similar strips of the Figures 1 and 2.

The triangular sections 98, 100 and 102 are a means for deriving the residue signal. They lie in the area between a line passing through the upper left corners of the strips 94 and 96 and the strips themselves. They are electrically connected together to a common output lead 104. The zero signal position of the beam is adjusted to coincide with the dotted line 110 which is seen to pass through the apex of the triangular section 98. The maximum amplitude of the signals from source 82′ is just sufficient to deflect the beam to the bottom edges of the strips 94, 96 and the triangular section 102.

The overall operation of the transmitter of Figure 3A will now be described. Whenever the amplitude of the signal supplied by the source 82′ is sufficient to deflect the beam within a zone lying between the dotted line 110 and the top of strip 94, a voltage is supplied to modulator 86, via lead 104, that is exactly proportional to this amplitude. The reason for this is that the voltage on lead 104 depends upon the area of the horizontal beam 92 intersected by the triangular target 98. When the amplitude of the signals is sufficiently great to deflect the beam to the top of strip 94, the key 66′ is made operative to pass radio frequency energy to the power amplifier 68′. As the amplitude of the signal increases from this point, the voltage supplied to the modulator 86 via the lead 104 gradually increases as larger areas of the beam are intersected by the triangular section 100. In a similar manner, the key 62′ permits the radio frequency energy to be supplied to the power amplifier 64′ when the beam is deflected so as to intersect the strip 96. As the beam is deflected down the triangular section 102, the voltage supplied to the modulator 86 gradually increases. The voltage thus supplied by the triangular strips 98, 100 and 102 to the modulator 86 is the difference between the signal derived from source 82′ and the sum of the signals from the vertical strips 94 and 96. This is the same as the residue signals described above, as the currents supplied to the antenna 76′ by the power amplifiers 64′ and 68′ are proportional to the voltages developed by the strips 94 and 96.

If, for any reason, the voltages developed by strips 94 and 96 are not proportional to the currents supplied to the antenna 76′ by the power amplifiers 64′ and 68′, the signal that is actually transmitted could be detected and subtracted from the signal provided by the source 82′. The residue signal thus derived could then be applied to the modulator 86. However, it is simpler to derive the residue independently of the transmission link described above.

There are certain advantages to be derived by combining the currents or voltages of the power amplifiers or high frequency power generating devices, as is done in the apparatus of Figures 2 and 3. In the first place, the voltage derived from a source of signals can be used directly and need not be changed into its power function by a device such as 20 of Figure 1. Because the current provided by the power amplifier 88 is added to the current of the power amplifiers 64′ and 68′, the transmitted power devoted to the residue signal is always of the appropriate amount. If, as in Figure 1, the residue signal were to be added to the predetermined levels of power supplied by power amplifiers 4, 6 respectively, it would have to be made greater, as it was added to successive levels.

Figure 4:
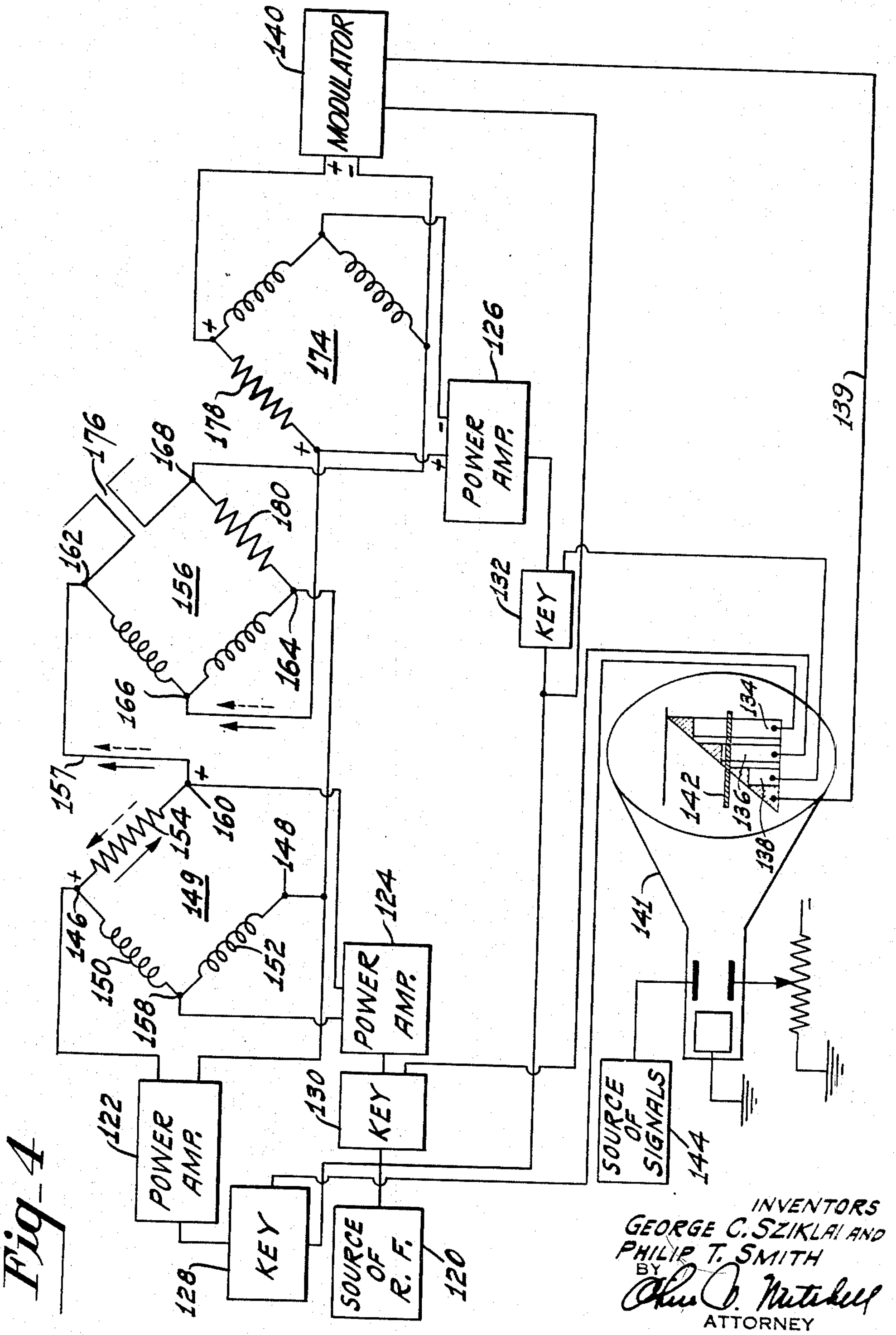
Figure 4 illustrates the application of the invention to a transmitter that is similar to that of Figure 3A, except in the manner of combining the currents of the output stages.

Figure 4 illustrates the application of this invention to a transmitter in which the currents of voltages of the power amplifiers or high frequency power generating devices are added in a different manner from that discussed in connection with Figures 2 and 3. Here again, the apparatus for combining the currents of the power amplifiers does not per se constitute a part of this invention. However, in order to show how it forms an effective combination with other apparatus so as to operate in accordance with the invention, a detailed explanation follows.

The supply of radio frequency energy from source 120 to the power amplifiers 122, 124 and 126 is controlled by keys 128, 130 and 132, respectively. These keys are, in turn, controlled by the voltages developed by strips 134, 136 and 138 that form a part of a target of a cathode ray tube 141. The cathode ray tube 141 functions in a manner similar to that discussed in connection with the cathode ray tube 90 of Figure 3A. The residue signal is derived in the same manner as discussed in Figure 3A and is supplied via a lead 139 to modulator 140. The output of the power amplifier 122 is applied between one pair of diagonally opposed junctions 146 and 148 of a balanced bridge network 149. Two inductances 150 and 152 are connected in series between the junctions 146 and 148 so as to form one side of the bridge network 149. The other side of the bridge network 149 is comprised of a resistor 154 and another bridge network 156 connected in series. The junction 160 of the bridge network 149 is connected to a junction 162 of the bridge network 156, and the junction 148 of the bridge network 149 is connected to the diagonally opposite junction 164 of the bridge network 156. The output of the power amplifier 124 is applied between the other pair of diagonally opposed junctions 168 and 160 of the bridge network 149.

The operation of this portion of the circuit will now be explained. As is well known to those skilled in the art, such a bridge network 149 is in balance when the voltage supplied by the power amplifier 122 is in phase with a voltage supplied by power amplifier 124. This means that no voltage appears between the junctions 146 and 148 due to the power amplifier 124 and that no voltage appears between the junction 158 and 160 due to the power amplifier 122. Assume that the junction 146 is made positive by the voltage supplied by the power amplifier 122 and that the junction 160 is made positive by the power amplifier 124. Under these conditions, the current supplied by power amplifier 122 flows away from the junction 146 through the resistor 154, as indicated by the solid arrow and the current supplied by the power amplifier 124 flows in the opposite direction through the resistor 154, as indicated by the dotted arrow. Thus, because the currents are of equal amplitude and are in phase, the resultant current flow through resistor 154 is zero and no power is dissipated therein. However, the current supplied by both the power amplifiers 122 and 124 is seen to add in the bridge network 156, that forms the fourth arm of the bridge network 149, as indicated by the dotted and solid arrows parallel to a lead 157.

To proceed with the description of the apparatus of Figure 4, the junctions 166 and 168 that are diagonally opposed to the junctions 162 and 164 of the bridge network 156 are connected to a third bridge network 174 so that the bridge network 156 constitutes an arm of the bridge network 174. In a manner similar to that just described in connection with the bridge 149, the currents of the modulator 140 and the keyed amplifier 126 are added in this arm. If the polarities of the power outputs of the power amplifier 126 and the modulator 140 are selected as shown, the junction 166 of the bridge network 156 is positive. Therefore, the currents of all the power amplifiers 122, 124, 126 and the modulator 140 are seen to add in the antenna 176 that forms one arm of the bridge network 156.

In the arrangements shown the keys that control the power amplifiers are all alike. They are triggered by the separate voltage produced by the electron beam when it impinges on an individual strip of the target in the cathode ray tubes. Thus, the cathode ray tubes have been termed sorters, inasmuch as they operate different circuits in accordance with the quantized level of the signal to be transmitted. They are not quantizers because the output signals of the strips are not added by the cathode ray tubes. However, the various keys can be operated in response to the different levels of a quantizer such as the cathode ray tube 145 shown in Figure 4A. Those components that conform to the transmitter of Figure 4 are numbered with primed numerals. The stepped shaped target 147 is connected via a single output lead to all the keyers 128', 130' and 134'. The signal present on this output lead is the same as would be produced if the voltages supplied by the strips 134, 136 and 138 of the cathode ray tube 90 of Figure 4 were added together. In order to operate another key on each successive level of the quantized wave thus produced, the keys 128', 130' and 132' are differently biased by the potentiometer arrangement 149.

Figures 4A, 4B:
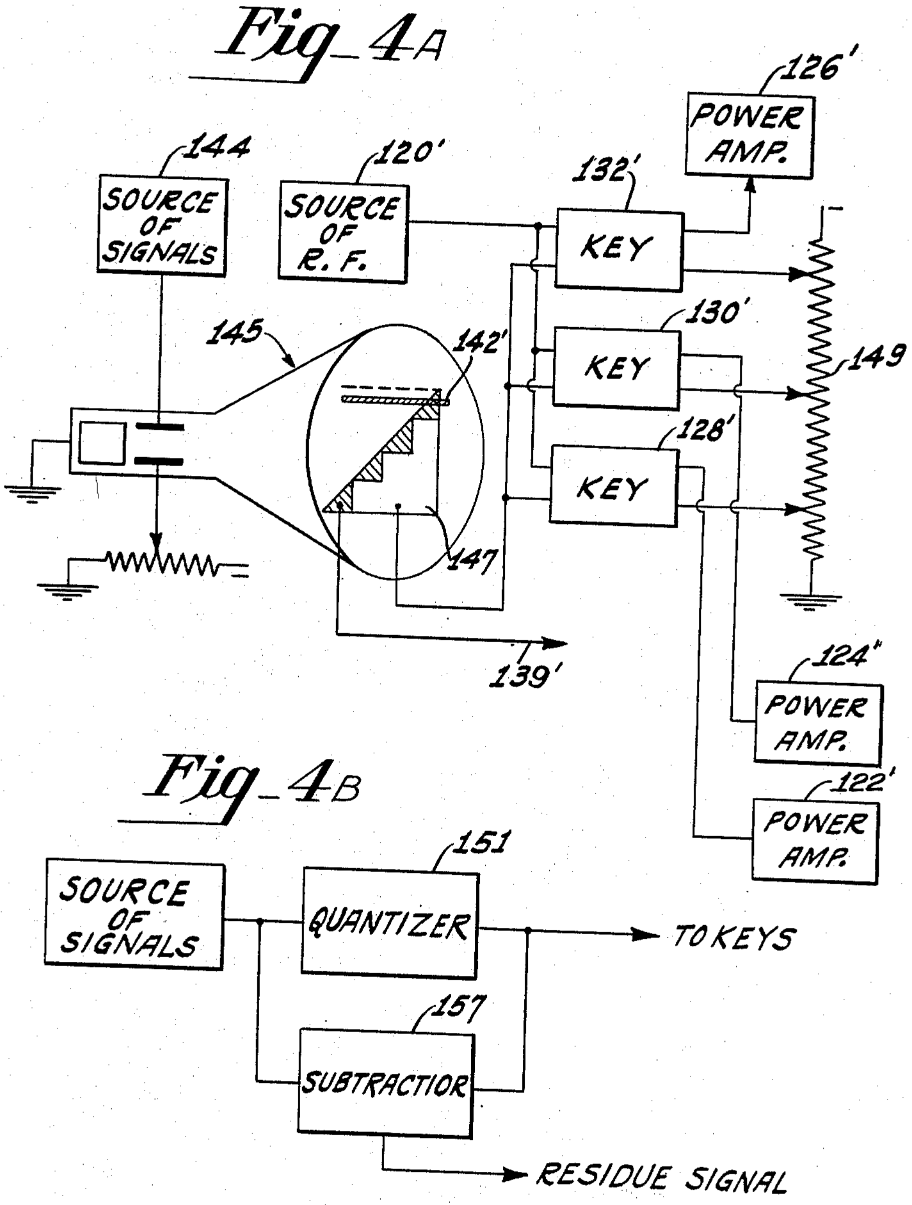
Figure 4A illustrates apparatus for triggering the keyers with a quantized wave.
Figure 4B illustrates apparatus employing a subtractor for extracting the residual signal.

In the transmitter of Figures 3A and 4 the residue signal has been derived by a series of triangular target areas such as 98, 100 and 102 of Figure 3A. However, Figure 4B illustrates another means for performing this function. The signals to be transmitted are applied to any well known type of quantizer 151 which has a stepped output signal as illustrated by waveform 85 of Figure 3. This wave is inverted in a subtractor 157 and added to the original signal to be transmitted. The waveform 85 is employed to trigger the keyers as discussed in connection with Figure 4A and the residue signal provided by the subtractor 157 is applied so as to modulate a power amplifier, as discussed previously.

The following example illustrates how the addition of currents or voltages of the power amplifiers simplifies the super-imposition of the residue signal onto the outputs of the keyed power amplifiers. Assume that the amplitude of the signal from the source 144 of Figure 4 is not sufficiently great to deflect the signal down to the top of the strip 134. In this case, no radio frequency energy will be supplied to or by the power amplifiers 122, 124 or 126. The only radio frequency energy supplied to the antenna 176 will therefore come from the modulator 140 that is modulated with the residue signal. The power from the modulator 140 is equally divided between a resistor 178 and the bridge network 156. Inasmuch as the bridge network 156 is balanced, the power thus supplied to it from the bridge network 174 will be equally divided between the antenna 176 and a resistor 180. Therefore, the power supplied to antenna 176 is only one-quarter of that originally supplied by the modulator 140. In a similar manner, the power contributed to the antenna 176 by any of the power amplifiers operating by themselves is reduced to one-fourth its original value. Therefore, just before the signal is strong enough to deflect the beam to the top of strip 134, the current supplied to the antenna 176 by the modulator 140 is a maximum. When the beam is deflected to the top of the strip 134, the output of the modulator 140 goes to zero and the output of the power amplifier 126 goes to the maximum value. Therefore, if the maximum power of all the power amplifiers is the same, the current supplied by the modulator 140 to the antenna 176 has a maximum value just equal to the difference between the current supplied by each of the power amplifiers 122, 124 and 126, as they are successively turned on.

On the other hand, where the powers of the outputs of the power amplifiers added as in the transmitter of Figure 1, the power devoted to the residue signal must be increased as more and more power amplifiers are turned on.

The following is a practical example of the increased power and efficiency that may be obtained by employing the principles of this invention. If eight type 828 transmitter tubes (the characteristics of which are found in the RCA Tube Manual) are operated in parallel and grid modulated in accordance with Class C Telephony practice, the maximum output obtainable is 323 watts. The required power input is 960 watts, and the overall efficiency is 35 percent. However, if these same tubes are operated in quantized keyed Class Telegraphy in accordance with this invention, the maximum power output is 1600 watts, and the power input is 2160 watts, and the efficiency is 74 percent. These figures favor the parallel operation because they do not take into account the loading that each parallel output stage presents to the other output stages. As discussed above, when current addition is used, this is not a problem, as the output stages operate independently of each other.

Figure 5:
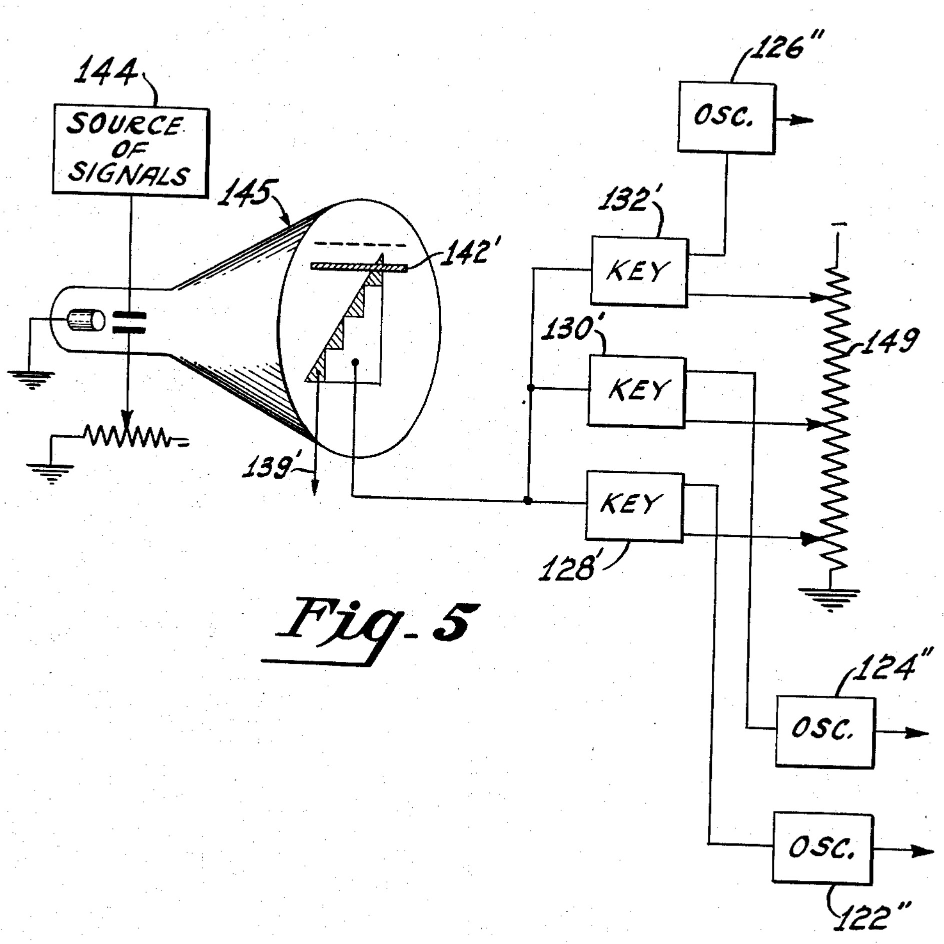
Fig. 5 illustrates apparatus for triggering the keys with a quantized wave wherein the keys control oscillators.

It has previously been stated that oscillators having the same frequency can be substituted for the power amplifiers of Figure 4A. Such an arrangement is illustrated in Figure 5. Corresponding components in Figure 4A and Figure 5 are denoted by the same numerals. In this particular arrangement the quantized output of the cathode ray tube 145 is applied to the keys 128′, 130′ and 132′ as was done in the arrangement of Figure 4A. However, the keys 128′, 130′ and 132′ are coupled to normally disabled oscillators 122″, 124″ and 126″ in such manner as to turn them on when the cut-off bias of the keying circuits is overcome by the quantized signal. The outputs of these oscillators may be coupled to a common output circuit such as antenna as described in connection with Figure 3A and Figure 4. The residue signal available on the lead 139′ may be applied so as to modulate a frequency that is the same as the frequency of the oscillators 122″, 124″ and 126″, and the modulation products may be combined with the output of the oscillators in the manner previously described.

What is claimed is:

1. A transmitter comprising in combination a plurality of sources of high frequency voltage waves, a source of signals that vary in accordance with a given intelligence, a level sorter to which said signals are applied, and means for operating a number of said power generating devices in proportion to the output of said level sorter.

2. A transmitter comprising in combination a plurality of sources of high frequency voltage waves, an output circuit, a source of signals that vary in accordance with a given intelligence, a level sorter, means for rendering at least some of a number of said power generating devices capable of delivering discrete amounts of energy to said output circuit, the number of said devices being determined in proportion to the output of said level sorter.

3. A transmitter comprising in combination means for supplying radio frequency energy, a source of intelligence bearing signals, an output circuit, a plurality of means for supplying said radio frequency energy to said output circuit, means for selecting the number of said means that are operative, depending on the magnitude of said intelligence bearing signals, means for deriving a residue signal, and means for supplying radio frequency energy to said output circuit in accordance with the value of the residue signal.

4. A transmitter comprising in combination a source of radio frequency voltage waves, a plurality of power amplifiers, a source of signals, means for rendering said power amplifiers operative to amplify said radio frequency voltage waves, the number of said power amplifiers in operation being dependent on discrete values of the signal level, means for deriving a residue signal that represents the difference between the sum of the output voltage provided by said power amplifiers and said signal, means for modulating one of said power amplifiers with said residue signal, and means for combining the output voltages contributed by all of said power amplifiers.

5. A transmitter comprising in combination a source of voltage waves of carrier frequency, a plurality of power amplifiers, keyers connected so as to control the application of said voltage waves of carrier frequency to said power amplifiers, a source of signals, a quantizer, said quantizer being connected to said source of signals, the output of said quantizer being connected to each of said keyers, means for deriving a residue voltage wave that is representative of the difference between the output of said source of signals and said quantizer, an output amplifier, a modulator connected between said output amplifier and said source of voltage waves, said residue voltage wave being coupled to said modulating means, and means for combining the outputs of said power amplifiers.

6. A transmitter comprising in combination a source of radio frequency voltage waves, a plurality of output amplifiers, a source of signals, a quantizer to which said signals are applied, means for deriving the difference between said signals and the output of said quantizer, a modulator connected between said source of radio frequency voltage waves and one of said output amplifiers, the output of said means being connected to said modulator, means for applying said radio frequency waves to a number of the rest of said output amplifiers in accordance with the output of said quantizer, and means for combining the currents of said output amplifiers.

7. A transmitter such as described in claim 6 in which the means for applying said radio frequency waves to the output amplifiers have sufficient gain to saturate said output amplifiers.

8. A transmitter comprising in combination a source of radio frequency voltage waves, a plurality of output amplifiers, a modulator connected between said source and at least one of said output amplifiers, a plurality of keyers, each of said keyers being connected between said source and one of the remaining output amplifiers, a source of signals, quantizing means connected to said source of signals, means for deriving a residue signal, connections between the output of said latter means and said modulator, connections between said quantizer and each of said keyers, and means for combining the outputs of all said output amplifiers.

9. A transmitter comprising in combination a source of radio frequency energy, a plurality of power amplifiers, a source of intelligence signals, means for supplying a predetermined number of said power amplifiers with radio frequency energy from said source of radio frequency energy in accordance with the level of the intelligence signals, and means for combining the outputs of said power amplifiers.

10. A transmitter such as described in claim 9 in which the means for supplying a predetermined number of power amplifiers with radio frequency energy operates in accordance with the power level of said signals.

11. A transmitter such as described in claim 9 in which the means for supplying a predetermined number of power amplifiers with radio frequency energy operates in accordance with the voltage level of said signals.

12. A transmitter comprising in combination a source of radio frequency energy, a plurality of power amplifiers, keying means for applying said radio frequency energy to said power amplifiers, a source of signals corresponding to a given intelligence, means for controlling said keys in accordance with the output level of said signals, and means for combining the outputs of said power amplifiers.

13. A transmitter comprising in combination a source of signals that vary in amplitude in accordance with intelligence to be transmitted, a plurality of normally disabled sources of voltage oscillations, and means for keying a number of said sources into operation in response to the signal, the number being proportional to the voltage level of the signals.

References Cited in the file of this patent

UNITED STATES PATENTS

| Number | Name | Date |
|---|---|---|
| 2,413,440 | Farrington | Dec. 31, 1946 |
| 2,448,814 | Mannet et al. | Sept. 7, 1948 |
| 2,453,454 | Norwine | Nov. 9, 1948 |
| 2,480,130 | Grieg | Aug. 30, 1949 |
| 2,498,688 | Lesti | Feb. 28, 1950 |